(12) United States Patent
Inoue et al.

(10) Patent No.: US 12,129,809 B2
(45) Date of Patent: Oct. 29, 2024

(54) ENGINE CONTROL DEVICE

(71) Applicant: MITSUBISHI JIDOSHA KOGYO KABUSHIKI KAISHA, Tokyo (JP)

(72) Inventors: Yoshiya Inoue, Tokyo (JP); Ryota Asakura, Tokyo (JP); Ryota Nakada, Tokyo (JP); Takayuki Shirota, Tokyo (JP); Sho Iizuka, Tokyo (JP); Kazuo Kurata, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/278,510

(22) PCT Filed: Mar. 29, 2021

(86) PCT No.: PCT/JP2021/013201
§ 371 (c)(1),
(2) Date: Aug. 23, 2023

(87) PCT Pub. No.: WO2022/208575
PCT Pub. Date: Oct. 6, 2022

(65) Prior Publication Data
US 2024/0151190 A1    May 9, 2024

(51) Int. Cl.
*F02D 41/30*   (2006.01)
*F02D 37/02*   (2006.01)

(52) U.S. Cl.
CPC ......... *F02D 41/3094* (2013.01); *F02D 37/02* (2013.01)

(58) Field of Classification Search
CPC ... F02D 41/08; F02D 2200/602; B60R 16/03; B60T 7/042; B60T 2220/04; F02B 63/042
See application file for complete search history.

(56) References Cited

U.S. PATENT DOCUMENTS

| | | | | |
|---|---|---|---|---|
| 4,882,695 A | * | 11/1989 | Mieno | F02P 5/1528 701/111 |
| 2006/0016407 A1 | * | 1/2006 | Miyanoo | F01L 13/0015 123/90.15 |

(Continued)

FOREIGN PATENT DOCUMENTS

| JP | 7-42557 A | 2/1995 |
|---|---|---|
| JP | 2013-217335 A | 10/2013 |

(Continued)

OTHER PUBLICATIONS

English translation of WO2014049646A.*

(Continued)

*Primary Examiner* — Joseph J Dallo
(74) *Attorney, Agent, or Firm* — Birch, Stewart, Kolasch & Birch, LLP

(57) ABSTRACT

A control device for controlling an engine includes main-chamber injecting means (1,3) that supplies a main chamber (8) with fuel; sub-chamber injecting means (2) that supplies a sub chamber (5) with fuel after the main chamber injecting means (1,3) supplies the fuel; estimating means (21) that estimates a degree of knocking serving as indices of an intensity of the knocking and an occurrence frequency of the knocking; and fuel controlling means (22) that carries out, when the degree (N) of the knocking is a first predetermined value ($N_1$) or more, fuel control that reduces a sub-chamber fuel amount representing an amount of fuel supplied by the sub-chamber injecting means (2). By reducing the sub-chamber fuel amount in this manner, the occurrence of knocking can be suppressed, so that the combustion state of a divided-combustion-chamber engine can be enhanced.

8 Claims, 7 Drawing Sheets

(56) References Cited

U.S. PATENT DOCUMENTS

| | | | | |
|---|---|---|---|---|
| 2009/0095546 | A1* | 4/2009 | Zubeck | F02D 41/0027 |
| | | | | 180/54.1 |
| 2015/0075506 | A1 | 3/2015 | Ishida et al. | |
| 2019/0226443 | A1* | 7/2019 | Yoneya | F02D 41/34 |
| 2021/0262393 | A1* | 8/2021 | Leone | F02C 7/266 |

FOREIGN PATENT DOCUMENTS

| | | | | |
|---|---|---|---|---|
| JP | 2016-113982 A | 6/2016 | | |
| JP | 2017-180247 A | 10/2017 | | |
| JP | 2018-105171 A | 7/2018 | | |
| WO | WO-2004099584 A1 * | 11/2004 | | F02B 19/108 |
| WO | WO-2005103483 A1 * | 11/2005 | | F02D 35/02 |
| WO | WO-2014049646 A1 * | 4/2014 | | F02B 19/108 |
| WO | WO-2017130501 A1 * | 8/2017 | | F02B 37/00 |

OTHER PUBLICATIONS

International Preliminary Report on Patentability, issued in PCT/JP2021/013201, PCT/IPEA/409, dated Apr. 18, 2023.
International Search Report, issued in PCT/JP2021/013201, PCT/ISA/210, dated Jun. 15, 2021.
Written Opinion of the International Searching Authority, issued in PCT/JP2021/013201, PCT/ISA/237, dated Jun. 15, 2021.
International Preliminary Report on Patentability dated Oct. 5, 2023 for Application No. PCT/JP2021/013201.

\* cited by examiner

ENGINE CONTROL DEVICE

TECHNICAL FIELD

The present invention relates to a control device for controlling an engine having a main chamber and a sub chamber in a combustion chamber.

BACKGROUND TECHNIQUE

Conventionally, a divided-combustion-chamber engine has been known in which a main chamber (main combustion chamber) and a sub chamber (sub combustion chamber) communicating with each other are formed in a combustion chamber and an ignition plug electrode is arranged inside the sub chamber. In this engine, a flame generated inside the sub chamber is formed so as to be ejected toward the main chamber in a torch-like form. This makes it possible to, even if the air-fuel ratio in the main chamber is leaner than the stoichiometric air-fuel ratio, efficiently combust the fuel-air mixture (see Patent Document 1).

PRIOR ART REFERENCE

Patent Document

[Patent Document 1] Japanese Laid-open Patent Publication No. 2018-105171

SUMMARY OF INVENTION

Problems to be Solved by Invention

A divided-combustion-chamber engine needs to supply an adequate amount of fuel to the interior of the sub chamber and therefore the injection period during which fuel injection to the sub chamber is performed is more likely to be restricted as compared to other engines. In addition, since the correlation between an injection period and an ignition timing of fuel is important, the range of the proper ignition timing is narrower than that of other engines. For the above, a divided-combustion-chamber engine has a difficulty in significantly changing the ignition timing to deal with inconvenience such as knocking or combustion failure and in consequently stabilizing the combustion state thereof.

With the foregoing problems in view, one of the objects of the present embodiment is to enhance the combustion state of a divided-chamber combustion engine. In addition to this object, influences and effects which are derived from each configuration of "an embodiment to carry out the invention" to be described below and which conventional technique does not attain can be regarded as other objects of the present disclosure.

Means to Solve the Problem

According to the present embodiment, a control device for controlling an engine includes main-chamber injecting means that supplies a main chamber with fuel; sub-chamber injecting means that supplies a sub chamber with fuel after the main chamber injecting means supplies the fuel; estimating means that estimates a degree of knocking serving as indices of an intensity of the knocking and an occurrence frequency of the knocking; and fuel controlling means that carries out, when the degree of the knocking is a first predetermined value or more, fuel control that reduces a sub-chamber fuel amount representing an amount of fuel supplied by the sub-chamber injecting means; and ignition controlling means that carries out ignition control that retards an ignition timing. When the degree of the knocking is the first predetermined value or more after the fuel control is carried out by the fuel controlling means, the ignition control is carried out.

Effect of Invention

The control device for controlling an engine of the present embodiment can enhance the combustion state of a divided-combustion-chamber engine.

EMBODIMENT TO CARRY OUT INVENTION

1. Structure

Figure 1:
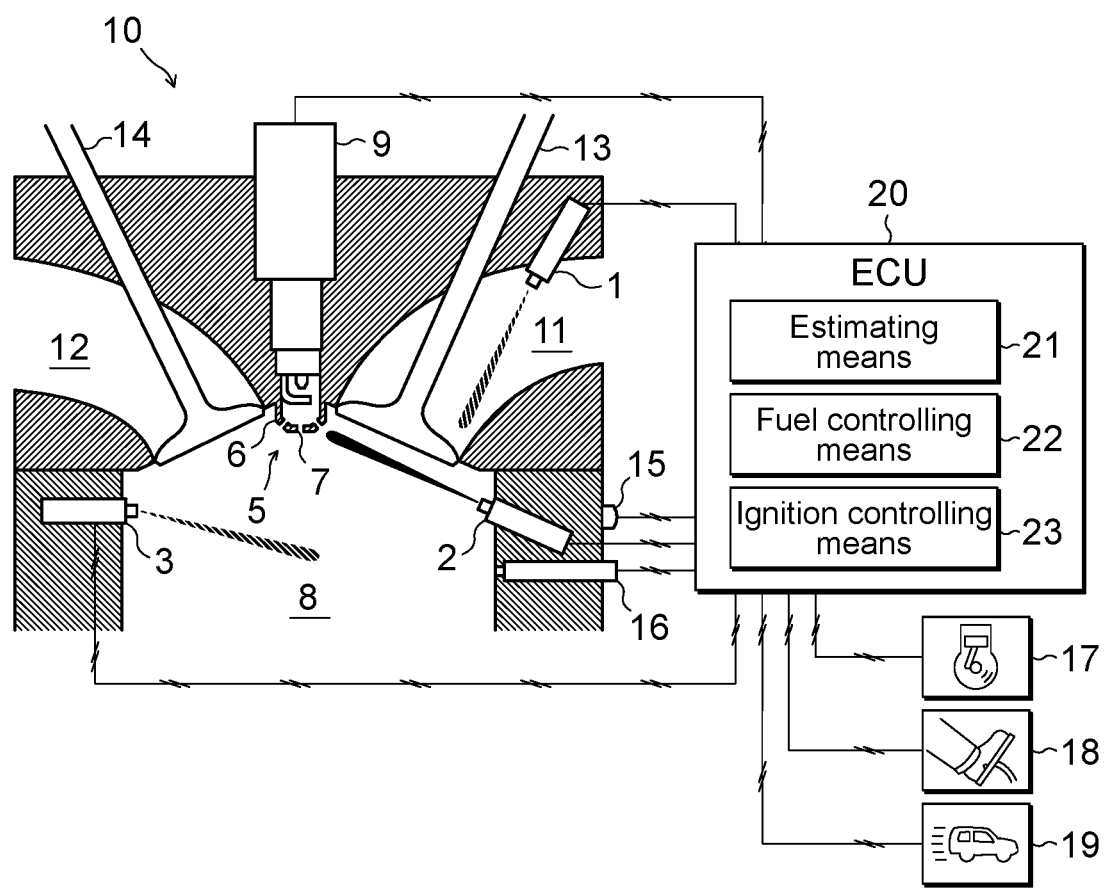
FIG. 1 is a diagram schematically showing the configuration of an engine adopting a control device according to an embodiment.
Figure 2:
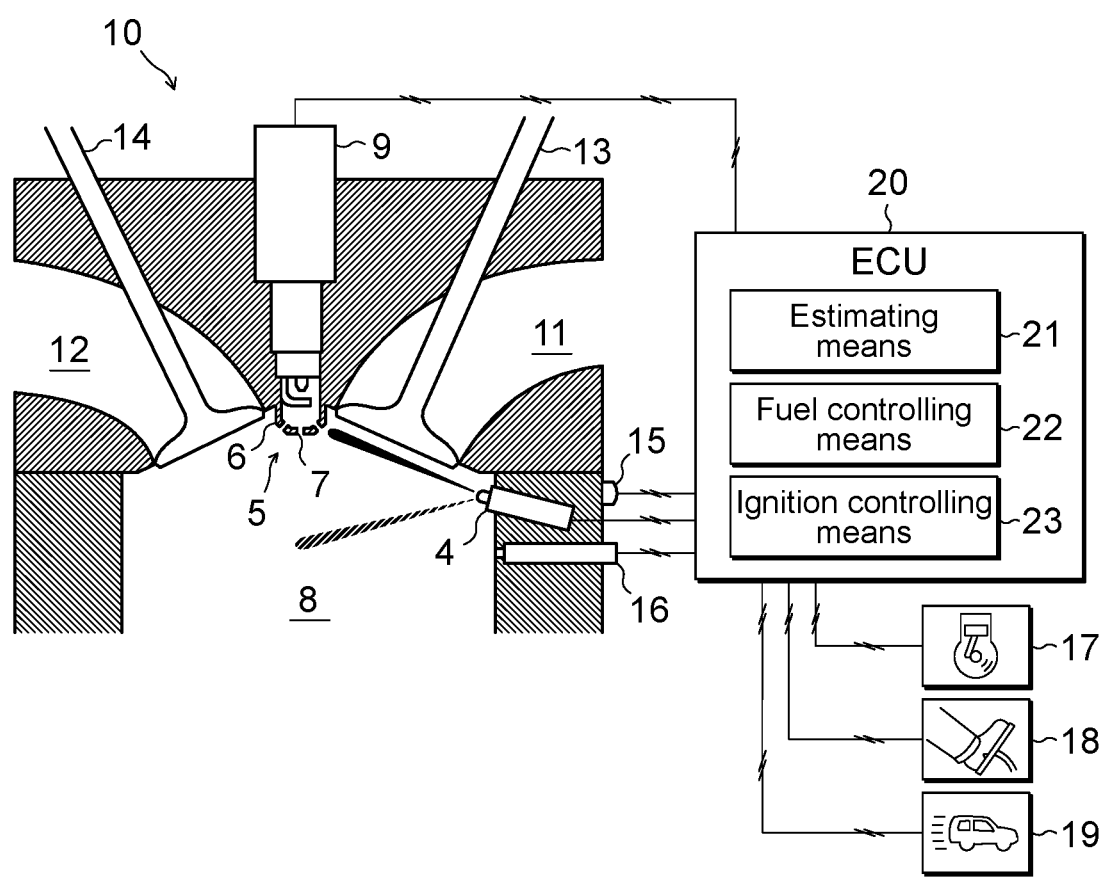
FIG. 2 is a diagram schematically showing the configuration of another engine adopting the control device according to the embodiment.

FIGS. 1-8 are diagrams showing a control device for controlling an engine 10 (internal combustion engine) mounted on a vehicle. Both FIG. 1 and FIG. 2 schematically illustrate the structure of a passive-type divided-combustion-chamber engine 10 in which a main chamber 8 (main combustion chamber) and a sub chamber 5 (sub combustion chamber) communicating with each other are formed in a cylinder. FIG. 1 illustrates an example of the structure of the engine 10 that is separately provided with an injection valve (sub-chamber injection valve 2) that supplies a sub chamber 5 with fuel and an injection valve (port injection valve 1, cylinder injection valve 3) that supplies the main chamber 8 with fuel. On the other hand, FIG. 2 illustrates another example of the engine 10 having a single injection valve (multi-function injection valve 4) that injects fuel each of the main chamber 8 and the sub chamber 5 individually.

A control device of the engine 10 according to the present embodiment include main-chamber injecting means (port injection valve 1, cylinder injection valve 3, multi-function injection valve 4) that supplies the main chamber 8 with fuel, and sub chamber injecting means (sub-chamber injection valve 2, multi-function injection valve 4) that supplies the sub chamber 5 with fuel. Fuel supply by the sub-chamber injecting means is performed after fuel supply by the main chamber injecting means in a single combustion cycle (a cycle consisting of four strokes: intake; compression; combustion; and exhaust). For example, the fuel supply by the main-chamber injecting means is carried out from the latter half of the exhaust stroke to the intake stroke. In contrast, the fuel supply by the sub-chamber injecting means is carried out in the intake stroke or the compression stroke after main chamber injection. Therefore, even if being carried out by a single injection valve, the main-chamber injection and the sub-chamber injection can be clearly discriminated from each other on the basis of their injection timings.

Not all of the fuel injected from the main-chamber injecting means is combusted only in the main chamber 8, and some of the injected fuel may also flow into the sub chamber 5. Similarly, not all the fuel injected from the sub-chamber injecting means may be combusted only in the sub chamber 5, and some of the fuel may also flow into the main chamber 8. However, fuel injected from the main-chamber injecting means is fuel intended to combust in the main chamber 8. The fuel injected from the main-chamber injecting means is therefore injected at a timing of easily combusting in the main chamber 8, and most of it combusts in the main chamber 8. Similarly, fuel injected from the sub-chamber injecting means is fuel intended to combust in the sub chamber 5. The fuel injected from the sub-chamber injecting means is therefore injected at a timing of easily combusting in the sub chamber 5, and most of it combusts in the sub chamber 5. Accordingly, the main chamber injection means may be defined as "means that supplies fuel at a timing suitable for combusting in the main chamber 8", and the sub chamber injecting means may be defined as "means that supplies fuel at a timing suitable for combusting in the sub chamber 5".

As shown in FIGS. 1 and 2, the sub chamber 5 is formed in a hollow-hemispherical shape, for example, bulging from the center portion of the top face of the combustion chamber toward a piston side. FIG. 1 and FIG. 2 each show an example in which the sub chamber 5 is arranged between an intake port 11 and an exhaust port 12 in a pent-roof-type cylinder head. The position of the sub chamber 5 is preferably set in consideration of the entire shape of the combustion chamber or in consideration of the operating ranges of the intake valve 13 or the exhaust valve 14. Alternatively, the sub chamber 5 may be arranged outward from the intake port 11 or the exhaust port 12 in the cylinder.

Minute through-holes 7 are formed on a partition wall 6 separating the sub chamber 5 from the main chamber 8. An electrode of an ignition plug 9 is disposed inside the sub chamber 5. When the air-fuel mixture is ignited in the sub chamber 5, the resultant flame is ejected, in a torch-like form, from the sub chamber 5 to the main chamber 8 through the multiple through-holes 7. Among passive-type engines that are each supplied with fuel to form flame from the external of the sub chamber 5, the engine 10 of the present embodiment is a divided-combustion-chamber engine 10 that supplies fuel by fuel injection from the sub-chamber injecting means to form the air-fuel mixture in the sub chamber 5. However the passive-type engines are not limited such the divided-combustion-chamber engine 10. The passive-type engines include various types that are supplied with fuel from the external of the sub chamber 5 exemplified by a type that supplies fuel to form flames in vicinity of the sub chamber 5 and introduces the fuel supplied in vicinity of the sub chamber 5 into the sub chamber 5 due to increase in pressure in the cylinder by the compression stoke. On the other hand, an engine 10 that directly injects fuel in the sub chamber 5 also exists, which is however not described in the present embodiment. Such an engine 10 is called an active divided-combustion-chamber engine 10.

The port injection valve 1 shown in FIG. 1 is one element of the main-chamber injecting means and is a passive-type injector that injects fuel to the intake port 11. The injection direction of the fuel by the port injection valve 1 is set, for example, in a direction toward the gap between the intake valve 13 and the intake port 11 that are in the opened state. The cylinder injection valve 3 is also one element of the main-chamber injecting means, and is an injector that injects fuel to the main chamber 8. The injection direction of the fuel by the cylinder injection valve 3 is set in accordance with, for example, the direction and the flow rate of the air flow (tumble flow or swirl flow) formed in the combustion chamber in the compression stroke. Either one of the injection valve 1 and the cylinder injection valve 3 can be omitted.

The sub-chamber injection valve 2 shown in FIG. 1 is one element of the sub-chamber injecting means and is a passive-type injector that injects fuel to the sub chamber 5. The injection direction of the sub-chamber injection valve 2 is set, for example, in a direction toward the sub chamber 5. However, the injection direction of the sub-chamber injection valve 2 is not limited only to direction toward the sub chamber 5. For example, in consideration of the direction and the flow rate of the air flow (tumble flow or swirl flow) formed in the cylinder, the fuel may be injected toward a position slightly deviated from the sub chamber 5.

The multi-function injection valve 4 shown in FIG. 2 is an injector having both a function as the main-chamber injecting means and a function as the sub-chamber injecting means. At least two injection holes are formed on the tip of the multi-function injection valve 4. One of the injection holes is an injection hole that achieves fuel injection similar to that by the cylinder injection valve 3 in FIG. 1 and that injects fuel to be supplied to the main chamber 8. The other one of the injection holes is an injection hole that achieves fuel injection similar to that by the sub-chamber injection valve 2 in FIG. 1 and that injects fuel to be supplied to the sub chamber 5. The opening and closing states of the respective injection holes are individually controlled.

The engine 10 is provided with a knocking sensor 15, a cylinder pressure sensor 16, an engine speed sensor 17, an accelerator position sensor 18, and a vehicle speed sensor 19. The knocking sensor 15 is a sensor that grasps the presence or absence of knocking, which is a kind of abnormal combustion, and detects, for example, force, pressure, and acceleration, or the like generated by vibration of the cylinder. The cylinder pressure sensor 16 is a sensor that grasps a combustion state in the combustion chamber, and detects the pressure of the main chamber 8. The engine speed sensor 17 is a sensor that grasps the operating state of the engine 10, and detects, for example, the engine speed per unit time (i.e., angular speed of the crankshaft). The accelerator position sensor 18 is a sensor that grasps a magnitude of torque (demand torque form driver) required for the engine 10, and detects a depression amount (accelerator position) of a non-illustrated accelerator pedal. The vehicle speed sensor 19 is a sensor that detects the vehicle speed (traveling speed) of the vehicle on which the engine 10 is mounted. The various pieces of information detected by the sensors 15 to 19 are transmitted to an ECU 20.

The ECU 20 is an Engine Control Unit or an Electronic Control Unit that controls the operating status of the engine 10 and an electronic device including a processor and a memory. An example of the processor is a microprocessor, such as a CPU (Central Processing Unit) and an MPU (Micro Processing Unit), and examples of the memory are a ROM (Read Only Memory), a RAM (Random Access Memory), and a non-volatile memory. The contents of the control performed by the control device 10 are recorded and stored as firmware or an application program in the memory, and when the program is to be executed, the contents of the program are expanded in a memory space and executed by the processor.

The ECU 20 is connected to each of the devices to be controlled and the sensors 15 to 19 via a non-illustrated on-board network. As shown in FIGS. 1 and 2, the devices to be controlled include the port injection valve 1, the sub-chamber injection valve 2, the cylinder injection valve 3, the multi-function injection valve 4, and the ignition plug 9. The fuel injection amount and the ignition timing of the engine 10 are collectively managed by the ECU 20. Alternatively, the fuel injection amount and the ignition timing can be adjusted by additionally using the information detected by one or more sensors not shown in FIG. 1 and FIG. 2. For example, the fuel injection amount and the ignition timing may be adjusted on the basis of temperature information detected by an outside air temperature sensor, an engine coolant temperature sensor, or the like.

The ECU 20 is provided with estimating means 21, fuel controlling means 22, and ignition controlling means 23. These elements represent functions implemented in the ECU 20 and can be programmed, for example, as software recorded and stored in a ROM or a supplementary storage in the ECU 20. Alternatively, these elements may be achieved as an electronic circuit (hardware) corresponding to the software, or may be achieved as a system composed on both software and hardware.

The estimating means 21 estimates a degree N of knocking serving as an index of the intensity and the occurrence frequency of the knocking. The degree N of knocking is calculated according to at least engine load. The degree N of knocking is calculated, preferably considering the engine load and the engine speed (an angular velocity of the engine), more preferably considering the cylinder pressure and the rotational fluctuation of the engine 10. A higher degree N of knocking (i.e., the larger value N representing a degree of knocking) is determined that the intensity of the knocking is higher or that the occurrence frequency of the knocking is higher. The present embodiment assumes that the value of the degree N of knocking shall be given by the product of a first index value $M_1$, a second index value $M_2$, and a third index value $M_3$ (That is, $N=M_1 \times M_2 \times M_3$). The estimating means 21 calculates the first index value $M_1$, the second index value $M_2$, the third index value $M_3$ for each combustion cycle, for example, and calculates the value of the degree N of knocking as the product of these indices. The information of the degree N of knocking calculated here is transmitted to the fuel controlling means 22 and the ignition controlling means 23.

Figure 3:
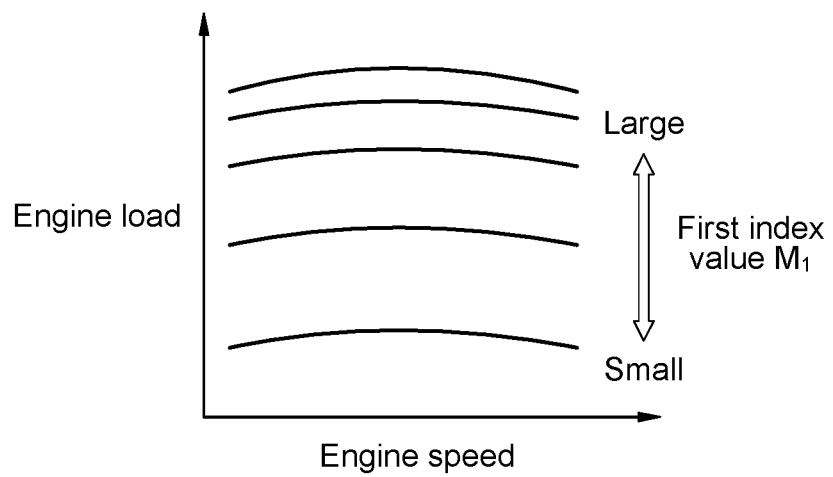
FIG. 3 is a map to set a first index value related to a degree of knocking.

The first index value $M_1$ is an index calculated on the basis of at least the engine load. In the present embodiment, the first index value $M_1$ is calculated on the basis of the engine load and the engine speed. FIG. 3 is a three-dimensional map that defines the relationship between the first index value $M_1$, the engine load, and the engine speed. The engine load is calculated on the basis of, for example, the accelerator position and the vehicle speed. The value of the first index value $M_1$ is set to a larger value as engine load is larger with respect to the same engine speed.

The increasing inclination of the first index value $M_1$ is set so as to increase as the engine load increases. This means that, in the three-dimensional map shown in FIG. 3, the distances between contour lines drawn by connecting points having the same first index value $M_1$ come to be narrower as the lines is positioned higher, i.e., a region of higher engine load. In addition, the first index value $M_1$ is set so as not to vary significantly with respect to a change in the engine speed. In other words, in the three-dimensional map shown in FIG. 3, the contour lines of the first index value $M_1$ extend in the left-right direction. Therefore, even if the first index value $M_1$ is calculated on the basis only of the engine load without considering the engine speed, the precision of the index value is not significantly impaired.

Figure 4A:
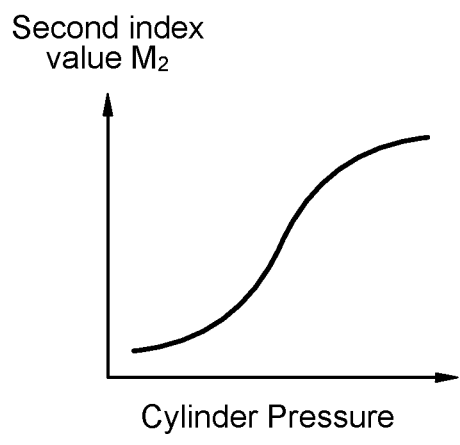
FIGS. 4(A) and 4(B) maps to set a second index value and a third index value related to a degree of knocking, respectively.

The second index value $M_2$ is an index calculated on the basis of the cylinder pressure. FIG. 4(A) is a two-dimensional map illustrating an example of the relationship between the second index value $M_2$ and the cylinder pressure. The value of second index value $M_2$ is set to a larger value as the cylinder pressure is higher. The relationship between the second index value $M_2$ and the cylinder pressure is set in accordance with the magnitude of the affect of the cylinder pressure on the degree N of knocking, and may be set to a relationship expressed by, for example, a linear graph, or may be set to a relationship expressed by a curved graph.

Figure 4B:
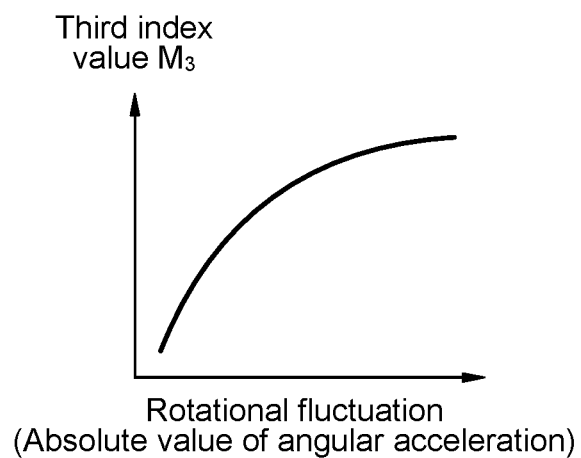

The third index value $M_3$ is an index calculated on the basis of the rotational fluctuation of the engine 10. FIG. 4(B) is a two-dimensional map illustrating an example of the relationship between third index value $M_3$ and the rotational fluctuation. The rotational fluctuation is given, for example, by the absolute value of a change inclination of the engine speed (an angular acceleration of the engine). The value of third index value $M_3$ is set to a larger value as the rotational fluctuation is larger. The relationship between the third index value $M_3$ and the rotational fluctuation is set in accordance with the magnitude of the affect of the rotational fluctuation on the degree N of knocking, and may be set to a relationship expressed by, for example, a linear graph, or may be set to a relationship expressed by a curved graph.

The fuel controlling means 22 controls a main-chamber fuel amount, which is the fuel amount supplied by the main-chamber injecting means, and a sub-chamber fuel amount, which is the fuel amount supplied by the sub-chamber injecting means. These fuel amounts are basically set on the basis of the engine load and the engine speed. On the other hand, if the degree N of knocking is higher than that when the engine 10 is in the normal operating state, fuel control that reduces the sub-chamber fuel amount is carried out. At this time, the reduction amount of the sub-chamber fuel amount is increased as the value of the degree N of knocking is larger. Conversely, if the degree N of knocking is lower than that when the engine 10 is in the normal operating state, fuel control that increases the sub-chamber fuel amount is carried out. At this time, the increase amount of the sub-chamber fuel amount is increased as the value of the degree N of knocking is smaller.

The sub-chamber fuel amount may be increased or decreased by controlling the pressure of the fuel supplied to the sub-chamber injecting means or the injection pressure. By decreasing or increasing the force of the injection without changing the timing of Start Of Injection (SOI) and the timing of End Of Injection (EOI) of the fuel injection, the sub-chamber fuel amount supplied in a single combustion cycle can be increased or decreased. Alternatively, the sub-chamber fuel amount may be increased or decreased by controlling the timings of start and end of the fuel injection. In this case, by shortening and prolonging the fuel injection period while keeping the pressure of the fuel supplied to the sub-chamber injecting means and the injection pressure constant, the sub-chamber fuel amount supplied in a single combustion cycle can be increased or decreased.

The main-chamber fuel amount may be set on the basis of the engine load and the engine speed regardless of the height of the degree N of knocking. Alternatively, the main-chamber fuel amount may be increased (or decreased) by a decreased (or increased) amount of the sub-chamber fuel so that the total amount of fuel injection does not change. Here, the typical main-chamber fuel amount is denoted by $F_{MAIN}$, and the typical sub-chamber fuel amount is denoted by $F_{SUB}$. Expressing a reduced amount of the sub-chamber fuel amount by $F_{DEC}$, the fuel amount actually injected by the sub-chamber injecting means is $F_{SUB}-F_{DEC}$. At this time, the fuel amount injected by the main-chamber injecting means may be unchanged from $F_{MAIN}$ or may be changed to $F_{MAIN}+F_{DEC}$. Alternatively, the fuel amount injected by the main-chamber injecting means may be in the range equal to or more than $F_{MAIN}$ and equal to or less than $F_{MAIN}+F_{DEC}$. Similarly, expressing an increased amount of the sub-chamber fuel by $F_{INC}$, the fuel amount actually injected by the sub-chamber injecting means is $F_{SUB}+F_{INC}$. At this time, the quantity of fuel injection from main chamber injection unit may be unchanged from $F_{MAIN}$ or may be $F_{MAIN}-F_{INC}$. Alternatively, the fuel amount injected by the main-chamber injecting means may be in the range equal to or more than $F_{MAIN}-F_{INC}$ and equal to or less than $F_{MAIN}$.

The ignition controlling means 23 controls the ignition timing (timing of igniting the fuel-air mixture) of the ignition plug 9. The ignition timing is basically set on the basis of the engine load and the engine speed. On the other hand, if the degree N of knocking is higher than that when the engine 10 is in the operating state, ignition control that retards the ignition timing is carried out. However, in a divided-combustion-chamber engine, which has a narrower range of a proper ignition timing than that of other engines, it is desired to suppress the change in ignition timing as much as possible. As a solution to the above, the control that retards the ignition is started only when the degree N of knocking is excessively high or when the effect of the fuel control that reduces the sub-chamber fuel amount is small.

Figure 5:
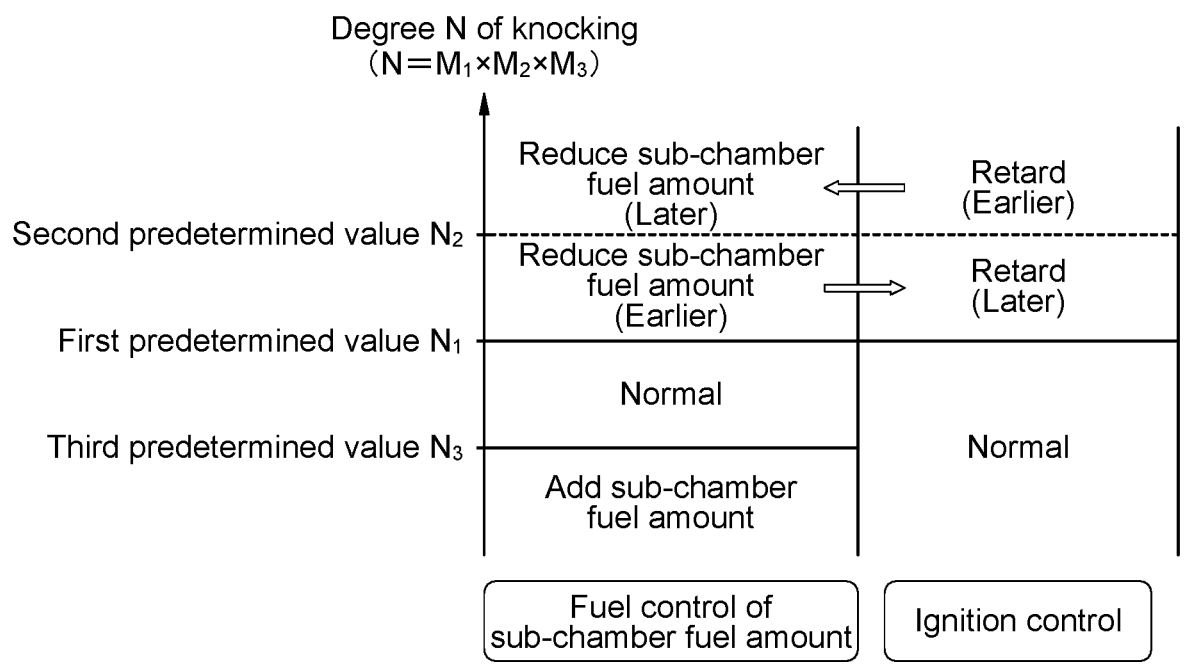
FIG. 5 is a schematic diagram showing relationship between a degree of knocking and types of control.

FIG. 5 is a table illustrating the relationship between the above-described various controls and the value of the degree N of knocking. If the value of the degree N of knocking is the first predetermined value $N_1$ or more, the reduction control on the sub-chamber fuel amount and ignition retarding control are performed. If the value of the degree N of knocking is the first predetermined value $N_1$ or more and is also less than the second predetermined value $N_2$ larger than the first predetermined value $N_1$, the reduction control on the sub-chamber fuel amount is carried out first and then the ignition retarding control is started. If the value of the degree N of knocking drops below the first predetermined value $N_1$ before the ignition retarding control is started, the ignition retarding control is not carried out, which means that the combustion state can be improved without shifting the ignition timing.

On the other hand, if the value of the degree N of knocking is the second predetermined value $N_2$ or more, the degree N of knocking is determined to be excessively high and the ignition retarding control is carried out first and then the reduction control of the sub-chamber fuel amount is carried out. The ignition retarding control can improve the combustion state of the engine 10 with high responsiveness as compared with the reduction control of the sub-chamber fuel amount. In other words, if the degree N of knocking is excessively high, the combustion state is rapidly and reliability improved by preferentially carrying out ignition retarding control. If the degree N of knocking drops below the second predetermined value $N_2$ before the reduction control on the sub-chamber fuel amount, the ignition retarding control is temporarily stopped and the reduction control on the sub-chamber fuel amount is started.

If the value of the degree N of knocking is less than the first predetermined value $N_1$, the ignition control is carried out at a normal ignition timing (i.e., the ignition timing set on the basis of the engine load and the engine speed). In relation to the fuel injection amount, if the value of the degree N of knocking is less than a third predetermined value $N_3$ smaller than first predetermined value $N_1$, fuel control that increases the sub-chamber fuel amount is carried out. If the value of the degree N of knocking is equal to or larger than the third predetermined value $N_3$ and less than the first predetermined value $N_1$, the engine 10 is controlled by the normal fuel amount (i.e., the main-chamber fuel amount and the sub-chamber fuel amount that are set on the basis of the engine load and the engine speed).

2. Flow Diagram

Figure 6:
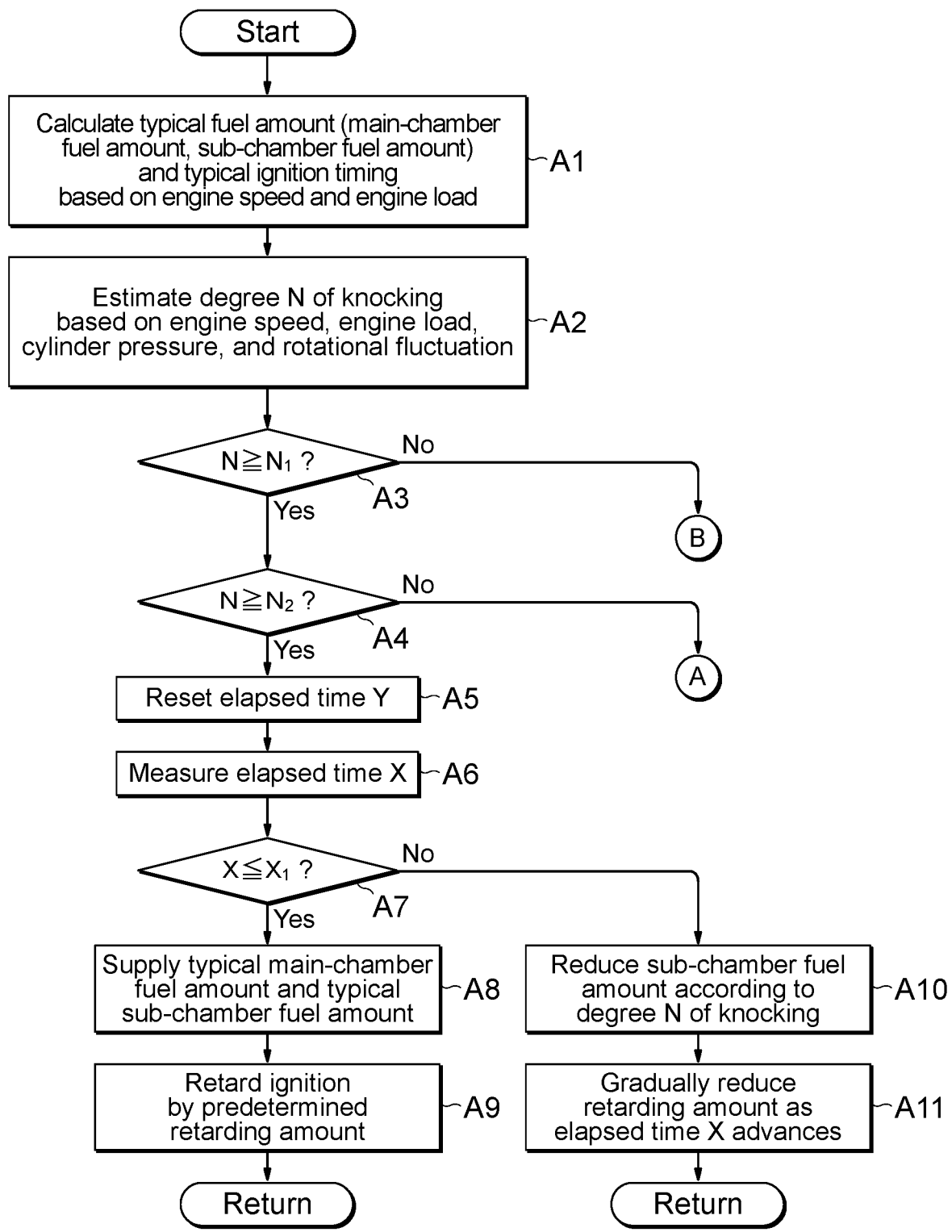
FIG. 6 is a flow diagram showing the details of control.
Figure 7:
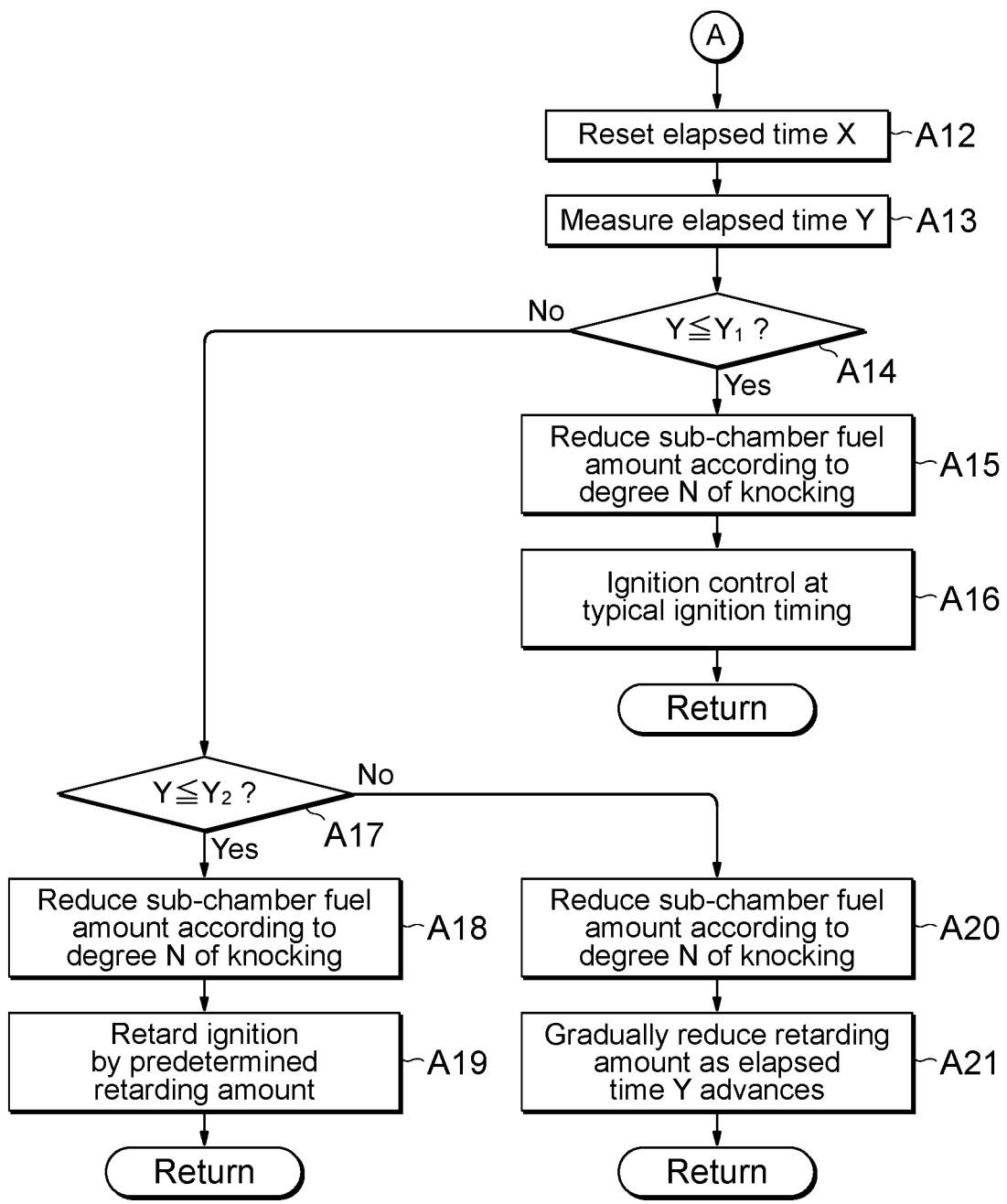
FIG. 7 is a flow diagram showing the details of control.
Figure 8:
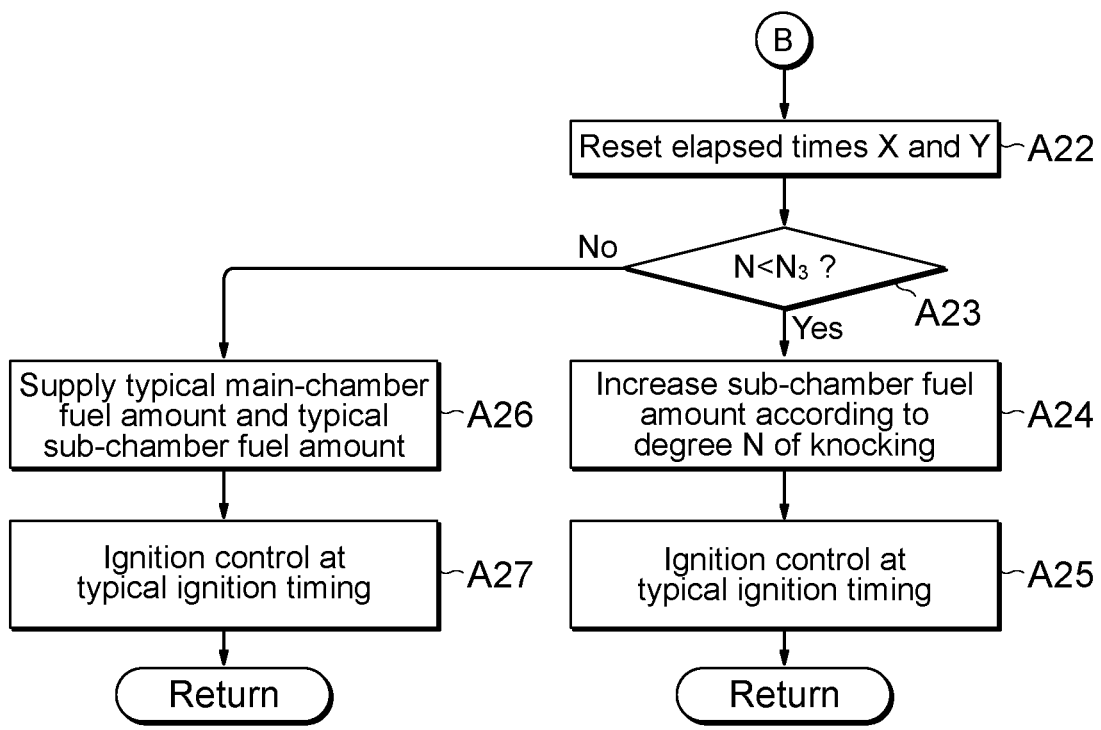
FIG. 8 is a flow diagram showing the details of control.

FIGS. 6-8 are flow diagrams showing the details of control performed in the ECU 20. The control of these flow diagrams are repeated in a unit of a period corresponding to an individual combustion cycle.

In Step A1 of FIG. 6, a typical fuel amount and also a typical ignition timing for the combustion cycle are calculated on the basis of the engine speed and the engine load. As the fuel amount, the main-chamber fuel amount and the sub-chamber fuel amount are calculated separately from each other. In the present embodiment, the sub-chamber fuel amount is calculated to be a less value than the man-chamber fuel amount. For example, the sub-chamber fuel amount may be from a few percent to a dozen percent of the entire fuel amount.

In Step A2, the estimating means 21 estimates the degree N of knocking, which serves as indices of the intensity and the occurrence frequency of the knocking. Here, for example, a first index value $M_1$ is calculated on the basis of the engine speed and the engine load. Further, a second index value $M_2$ is calculated on the basis of the cylinder pressure, and a third index value $M_3$ is calculated on the basis of the rotational fluctuation. Then, the value of the degree N of knocking is calculated as the product of these index values.

In Step A3, whether or not the value of the degree N of knocking is equal to or larger than the first predetermined value $N_1$. If the above condition is satisfied, the fuel control that reduces at least the sub-chamber fuel amount is carried out. In the present embodiment, the process proceeds to Step A4, and a further condition determination is made. If the value of the degree N of knocking is less than first predetermined value $N_1$ in Step A3, the process proceeds to the flow of FIG. 8 (from symbol B to Step A22) which will be described below.

In Step A4, determination is made as to whether or not the value of the degree N of knocking is equal to or lager than a second predetermined value $N_2$, which is lager than the first predetermined value $N_1$. When this condition is satisfied, it is determined that the occurrence of the knocking needs to be suppressed immediately and the procedure proceeds to Step A5 in order to cause the ignition retarding control to precede. If the degree N of knocking is less than the second predetermined value $N_2$ in Step A4, the process proceeds to the flow of FIG. 7 (from symbol A to Step A12) which will be described below. In Step A5, an elapsed time Y is reset. The elapsed time Y is a parameter referred to in the flow of FIG. 7, and represents the duration time of the state $N_1 \leq N < N_2$. In addition, measuring of an elapsed time X starts at Step A6, and the process proceeds to Step A7. The elapsed time X represents the duration time of the state $N \geq N_2$. The elapsed times X and Y may be in seconds or may be the number of combustion cycles.

In Step A7, the elapsed time X is determined whether to be a predetermined time $X_1$ or less. The predetermined time $X_1$ may be a preset time or the preset number of combustion cycles, or may be a time or the number of combustion cycles set in accordance with the engine speed. When this condition is satisfied, the process proceeds to Step A8, and the fuel injection is performed by a typical main-chamber fuel amount and a typical sub-chamber fuel amount. Further, in Step A9, the ignition retarding control is performed by a predetermined retarding amount. The retarding amount at this time is controlled on the basis of a typical ignition timing. The control in this combustion cycle is completed here, and the control is repeated from Step A1 in the ensuing combustion cycle. The controls of Steps A8 and A9 are continued until the elapsed time X becomes the predetermined time $X_1$ under a state where the value of the degree N of knocking is the second predetermined value $N_2$ or more. If the elapsed time X exceeds the predetermined time $X_1$, the process proceeds to Step A10.

In Step A10, fuel control that reduces the sub-chamber fuel amount according to the degree N of knocking is performed. Here, a higher value of the degree N of knocking more reduces the sub-chamber fuel amount. In addition, in Step A11, ignition retarding control that gradually reduces the retarding amount as the elapsed time X advances is carried out. This means that the ignition retarding control at a predetermined retarding amount is performed only during predetermined time $X_1$, and then the control is performed such that the ignition timing gradually comes closer to a typical ignition timing. In addition, the ignition retarding control at a predetermined retarding amount is performed prior to the reduction control on the sub-chamber fuel amount. The control in this combustion cycle is completed here, and the control is repeated from Step A1 in the ensuing combustion cycle. The controls of Steps A10 and A11 are continued as long as the value of the degree N of knocking is the second predetermined value $N_2$ or more after the elapsed time X exceeds the predetermined time $X_1$.

In Step A4 of FIG. 6, when the value of the degree N of knocking comes to be less than second predetermined value $N_2$, the control proceeds to the flow of FIG. 7. In Step A12 of FIG. 7, the elapsed time X is reset. In addition, measuring of the elapsed time Y starts at Step A13, and the process proceeds to Step A14. In Step A14, the elapsed time Y is determined whether to be a predetermined time $Y_1$ or less. The predetermined time $Y_1$ may be a preset time or the preset number of combustion cycles, or may be a time or the number of combustion cycles set in accordance with the engine speed. If this condition is satisfied, the process proceeds to step A15 and the fuel control that reduces the sub-chamber fuel amount according to the degree N of knocking is performed. Here, a higher value of the degree N of knocking more reduces the sub-chamber fuel amount.

Further, in Step A16, the ignition control is performed at the typical ignition timing. The control in this combustion cycle is completed here, and the control is repeated from Step A1 in the ensuing combustion cycle. The controls of Steps A15 and A16 are continued until the elapsed time Y becomes a predetermined time $Y_1$ under a state where the value of the degree N of knocking is the first predetermined value $N_1$ or more and is also less than the second predetermined value $N_2$. If the value of the degree N of knocking drops below the first predetermined value $N_1$ before the elapsed time Y reaches the predetermined time $Y_1$, only fuel control that reduces the sub-chamber fuel amount is performed without starting the ignition retarding. On the other hand, if the elapsed time Y exceeds the predetermined time $Y_1$, the process proceeds to Step A17.

In Step A17, the elapsed time Y is determined whether to be equal to or less than a predetermined time $Y_2$ larger than the predetermined time $Y_1$. The predetermined time $Y_2$ may be a preset time or the preset number of combustion cycles, or may be a time or the number of combustion cycles set in accordance with the engine speed. If this condition is satisfied, the process proceeds to step A18, and the fuel control that reduces the sub-chamber fuel amount according to the degree N of knocking is continued. Further, in Step A19, the ignition retarding control is performed by a predetermined retarding amount. The retarding amount at this time is controlled on the basis of the typical ignition timing. The control in this combustion cycle is completed here, and the control is repeated from Step A1 in the ensuing combustion cycle. The controls of Steps A18 and A19 are continued until the elapsed time Y becomes a predetermined time $Y_2$ under a state where the value of the degree N of knocking is the first predetermined value $N_1$ or more and is also less than the second predetermined value $N_2$. If the elapsed time Y exceeds the predetermined time $Y_2$, the process proceeds to Step A20.

In Step A20, the fuel control that reduces the sub-chamber fuel amount according to the degree N of knocking is continued. In addition, in Step A21, ignition retarding control that gradually reduces the retarding amount as the elapsed time X advances is carried out. This means that the ignition retarding control at a predetermined retarding amount is performed only during predetermined time $Y_2$-$Y_1$, and then the control is performed such that the ignition timing gradually comes closer to a typical ignition timing. The control in this combustion cycle is completed here, and the control is repeated from Step A1 in the ensuing combustion cycle. The controls of Steps A20 and A21 are continued as far as the value of the degree N of knocking is the first predetermined value $N_1$ or more and also is less than the second predetermined value $N_2$ after the elapsed time Y exceeds the predetermined time $Y_2$.

In Step A3 of FIG. 6, when the value of the degree N of knocking comes to be less than first predetermined value $N_1$, the control proceeds to the flow of FIG. 8. In Step A22 of FIG. 8, both elapsed times X and Y are reset. In addition, in Step A23, the value of the degree N of knocking is determined whether to be less than the third predetermined value $N_3$ smaller than the first predetermined value $N_1$. If this condition is satisfied, the process proceeds to Step A24 and the fuel control that increases the sub-chamber fuel amount according to the degree N of knocking is performed. Here, the smaller value of the degree N of knocking more increases the sub-chamber fuel amount. Further, in Step A25, the ignition control is performed at the typical ignition timing. The control in this combustion cycle is completed here, and the control is repeated from Step A1 in the ensuing combustion cycle. The controls of Steps A24 and A25 are continued as far as the value of the degree N of knocking is less than a third predetermined value $N_3$.

In Step A23, if the value of the degree N of knocking is equal to or larger than the third predetermined value $N_3$, the process proceeds to step A26 where the fuel injection is performed by a typical main-chamber fuel amount and a typical sub-chamber fuel amount. Further, in Step A27, the ignition control is performed at the typical ignition timing. As the above, if the degree N of knocking satisfies $N_3 \leq N < N_1$, the normal fuel control and the normal ignition control are performed. The control in this combustion cycle is completed here, and the control is repeated from Step A1 in the ensuing combustion cycle.

3. Actions and Effects (1) In the control device (i.e., ECU 20) of the engine 10 described above, the fuel control that reduces the sub-chamber fuel amount is carried out by the fuel controlling means 22 when the degree N of knocking estimated by the estimating means 21 is the first predetermined value $N_1$ or more. With this configuration, for example, the degree N of knocking can be lowered without changing the ignition timing, so that the occurrence of knocking can be suppressed. Therefore, the combustion state of the engine 10 can be stabilized. In addition, since the amount of fuel to be reduced is the sub-chamber fuel amount, the possibility of adversely affecting the combustion state in main chamber 8 is extremely small. Therefore, the combustion state of the engine 10 can be improved. If only the sub-chamber fuel amount is reduced while the main-chamber fuel amount is kept, the combustion state of the engine 10 can be easily improved without changing the control on the main-chamber injecting means side. Further, when the main-chamber fuel amount is increased in accordance with the reduction amount of the sub-chamber fuel amount, the change in the total fuel amount can be made small, and the combustion state of the engine 10 can be further stabilized.

(2) In the control device of the engine 10 described above, ignition control that retards the ignition timing is carried out by the ignition controlling means 23 when the degree N of knocking after the fuel control is carried out by the fuel controlling means 22 is equal to or larger than first predetermined value $N_1$. With this configuration, for example, in a case where knocking cannot be eliminated in a short time only by the fuel control, the ignition retarding control can be used in combination, and consequently the degree N of knocking can be reliably lowered. Therefore, the combustion state of the engine 10 can be improved.

(3) In the control device of the engine 10 described above, when the degree N of knocking is equal to or larger than the second predetermined value $N_2$ larger than the first predetermined value $N_1$, the ignition controlling means 23 carries out ignition retarding control first, and then the fuel controlling means 22 carries out fuel control that reduces the sub-chamber fuel amount. As the above, if the degree N of knocking is excessively high, the degree N of knocking can be lowered rapidly by preceding the ignition retarding control, which has superior responsiveness to the fuel control. Therefore, the combustion state of the engine 10 can be improved.

(4) In the control device of the engine 10 described above, the ignition controlling means 23 performs control that retards the ignition timing and then gradually reduces a retarding amount. With this configuration, the combustion state of the engine 10 can be stabilized as compared with the case where the ignition timing is sharply returned to the typical ignition timing. In addition, since a certain duration time of a state where the ignition timing is retarded from the typical ignition timing is continued, the degree N of knocking can be reliably lowered.

(5) In the control device of the engine 10 described above, when the degree N of knocking is less than third predetermined value $N_3$ less than first predetermined value $N_1$, the fuel controlling means 22 performs fuel control that increases the sub-chamber fuel amount. As the above, in an insufficient combustion state in which the degree N of knocking is excessively low, the combustion state of the engine 10 can be stabilized by increasing the sub-chamber fuel amount. In addition, since the amount of fuel to be increased is the sub-chamber fuel amount, the possibility of adversely affecting the combustion state in the main chamber 8 is extremely small. Therefore, the combustion state of the engine 10 can be improved. If only the sub-chamber fuel amount is increased while the main-chamber fuel amount is kept, the combustion state of the engine 10 can be easily improved without changing the control on the main-chamber injecting means side. Further, when the main-chamber fuel amount is reduced in accordance with the increase amount of the sub-chamber fuel amount, the change in the total fuel amount can be made small, and the combustion state of the engine 10 can be further stabilized.

4. Modification

The foregoing embodiment is illustrative only and is not intended to preclude the application of various modifications and techniques not explicitly set forth in the present examples. The configurations of the present embodiment can be variously modified without departing from the scope thereof. In addition, the configurations of the present embodiment can be selected and omitted as needed, or can be combined appropriately. For example, the above embodiment details the control device of the engine 10 mounted on a vehicle, but the application of the control device according to this embodiment is not limited to only an engine mounted on a vehicle. Alternatively, the control device can be applied to, for example, an engine installed in a ship or a power generation facility. The control device according to the present embodiment can be applied to an internal combustion engine including at least main-chamber injecting means and sub-chamber injecting means.

In addition, in the above embodiment, when the degree N of knocking is equal to or larger than the second predetermined value $N_2$ larger than the first predetermined value $N_1$, the ignition controlling means 23 carries out ignition retarding control first, and then the fuel controlling means 22 carries out fuel control that reduces the sub-chamber fuel amount. Alternatively, when the degree N of knocking is equal to or larger than a fourth predetermined value $N_4$ larger than the second predetermined value $N_2$, the ignition controlling means 23 and the fuel controlling means 22 can start the ignition retarding control and the fuel control at the same timing, respectively. Starting the ignition retarding control and the fuel control at the same timing in this way makes it possible to more rapidly and reliability lower the degree N of knocking.

DESCRIPTION OF REFERENCE SIGN

1 Port injection valve (Main-chamber injection means)
2 Sub-chamber injection valve (Sub-chamber injection means)
3 Cylinder injection valve (Main-chamber injection means)
4 Multi-function injection valve (Main-chamber injection means, Sub chamber injection means)
5 Sub chamber
6 Partition wall
7 Through-hole
8 Main chamber
9 Ignition plug
10 Engine
11 Intake port
12 Exhaust port 13 Intake valve
14 Exhaust valve
15 Knocking sensor
16 Cylinder pressure sensor
17 Engine speed sensor
18 Accelerator position sensor
19 Vehicle speed sensor
20 ECU (control device)
21 Estimating means
22 Fuel controlling means
23 Ignition controlling means
$M_1$ First index value
$M_2$ Second index value
$M_3$ Third index value
N Degree of knocking
$N_1$ First predetermined value
$N_2$ Second predetermined value
$N_3$ Third predetermined value
X Elapsed time
Y Elapsed time
$X_1$ Predetermined time
$Y_1$ Predetermined time
$Y_2$ Predetermined time

The invention claimed is:

1. A control device for controlling an engine, the control device comprising:
   main-chamber injecting means that supplies a main chamber with fuel;
   sub-chamber injecting means that supplies a sub chamber with fuel after the main chamber injecting means supplies the fuel;
   estimating means that estimates a degree of knocking serving as indices of an intensity of the knocking and an occurrence frequency of the knocking, a higher degree of knocking being determined that an intensity of the knocking is higher or that an occurrence frequency of the knocking is higher;
   fuel controlling means that carries out fuel control that reduces a sub-chamber fuel amount representing an amount of fuel supplied by the sub-chamber injecting means;
   an ignition plug disposed inside the sub-chamber to ignite an air-fuel mixture in the sub-chamber; and
   ignition controlling means that carries out ignition control that retards an ignition timing of the ignition plug, wherein
   when the degree of the knocking is a first predetermined value or more, the fuel controlling means carries out the fuel control and the ignition controlling means does not carry out the ignition control,
   after the fuel control is carried out by the fuel controlling means, if the degree of the knocking is still the first predetermined value or more, the ignition controlling means carries out the ignition control, and
   after the fuel control is carried out by the fuel controlling means, if the degree of the knocking is less than the first predetermined value, the fuel controlling means stop the fuel control and the ignition controlling means does not carry out the ignition control.

2. A control device for controlling an engine, the control device comprising:
   main-chamber injecting means that supplies a main chamber with fuel;
   sub-chamber injecting means that supplies a sub chamber with fuel after the main chamber injecting means supplies the fuel;
   estimating means that estimates a degree of knocking serving as indices of an intensity of the knocking and an occurrence frequency of the knocking, a higher degree of knocking being determined that an intensity of the knocking is higher or that an occurrence frequency of the knocking is higher:
   fuel controlling means that carries out fuel control that reduces a sub-chamber fuel amount representing an amount of fuel supplied by the sub-chamber injecting means:
   a ignition plug disposed inside the sub-chamber to ignite an air-fuel mixture in the sub-chamber; and
   ignition controlling means that carries out ignition control that retards an ignition timing of the ignition plug wherein
   a first predetermined value and a second predetermined value are defines as thresholds of the degree of knocking, the second predetermined value being larger than the first predetermined value,
   when the degree of the knocking is the first predetermined value or more and less than the second predetermined value, the fuel controlling means carries out the fuel control and the ignition controlling means does not carry out the ignition control,
   after the fuel control is carried out by the fuel controlling means, if the degree of the knocking is still the first predetermined value or more and less than the second predetermined value, the ignition controlling means carries out the ignition control,
   after the fuel control is carried out by the fuel controlling means, if the degree of the knocking is less than the first predetermined value, the fuel controlling means stop the fuel control and the ignition controlling means does not carry out the ignition control, and
   when the degree of the knocking is the second predetermined value or more, the ignition controlling means carries out the ignition control first and then the fuel controlling means carries out the fuel control.

3. The control device according to claim 1, wherein the ignition controlling means retards the ignition timing and then gradually reduces a retarding amount.

4. The control device according to claim 2, wherein the ignition controlling means retards the ignition timing and then gradually reduces a retarding amount.

5. The control device according to claim 2, wherein
   when the degree of the knocking is less than a third predetermined value smaller than the first predetermined value,
   the fuel controlling means carries out fuel control that increases the sub-chamber fuel amount.

6. The control device according to claim 3, wherein
   when the degree of the knocking is less than a third predetermined value smaller than the first predetermined value,
   the fuel controlling means carries out fuel control that increases the sub-chamber fuel amount.

7. The control device according to claim 4, wherein
   when the degree of the knocking is less than a third predetermined value smaller than the first predetermined value,
   the fuel controlling means carries out fuel control that increases the sub-chamber fuel amount.

8. A control device for controlling an engine, the control device comprising:
   main-chamber injecting means that supplies a main chamber with fuel:

sub-chamber injecting means that supplies a sub chamber with fuel after the main chamber injecting means supplies the fuel;
estimating means that estimates a degree of knocking serving as indices of an intensity of the knocking and an occurrence frequency of the knocking, a higher degree of knocking being determined that an intensity of the knocking is higher or that an occurrence frequency of the knocking is higher;
fuel controlling means that carries out fuel control that reduces a sub-chamber fuel amount representing an amount of fuel supplied by the sub-chamber injecting means;
a ignition plug disposed inside the sub-chamber to ignite an air-fuel mixture in the sub-chamber; and
ignition controlling means that carries out ignition control that retards an ignition timing of the ignition plug, wherein
a first predetermined value and a third predetermined value are defines as thresholds of the degree of knocking, the third predetermined value being smaller than the first predetermined value,
when the degree of the knocking is the first predetermined value or more, the fuel controlling means carries out the fuel control and the ignition controlling means does not carry out the ignition control,
after the fuel control is carried out by the fuel controlling means, if the degree of the knocking is still the first predetermined value or more, the ignition controlling means carries out the ignition control,
after the fuel control is carried out by the fuel controlling means, if the degree of the knocking is less than the first predetermined value, the fuel controlling means stop the fuel control and the ignition controlling means does not carry out the ignition control, and
when the degree of the knocking is less than the third predetermined value, the fuel controlling means carries out a second fuel control that increases the sub-chamber fuel amount.

* * * * *